United States Patent Office 3,264,213
Patented August 2, 1966

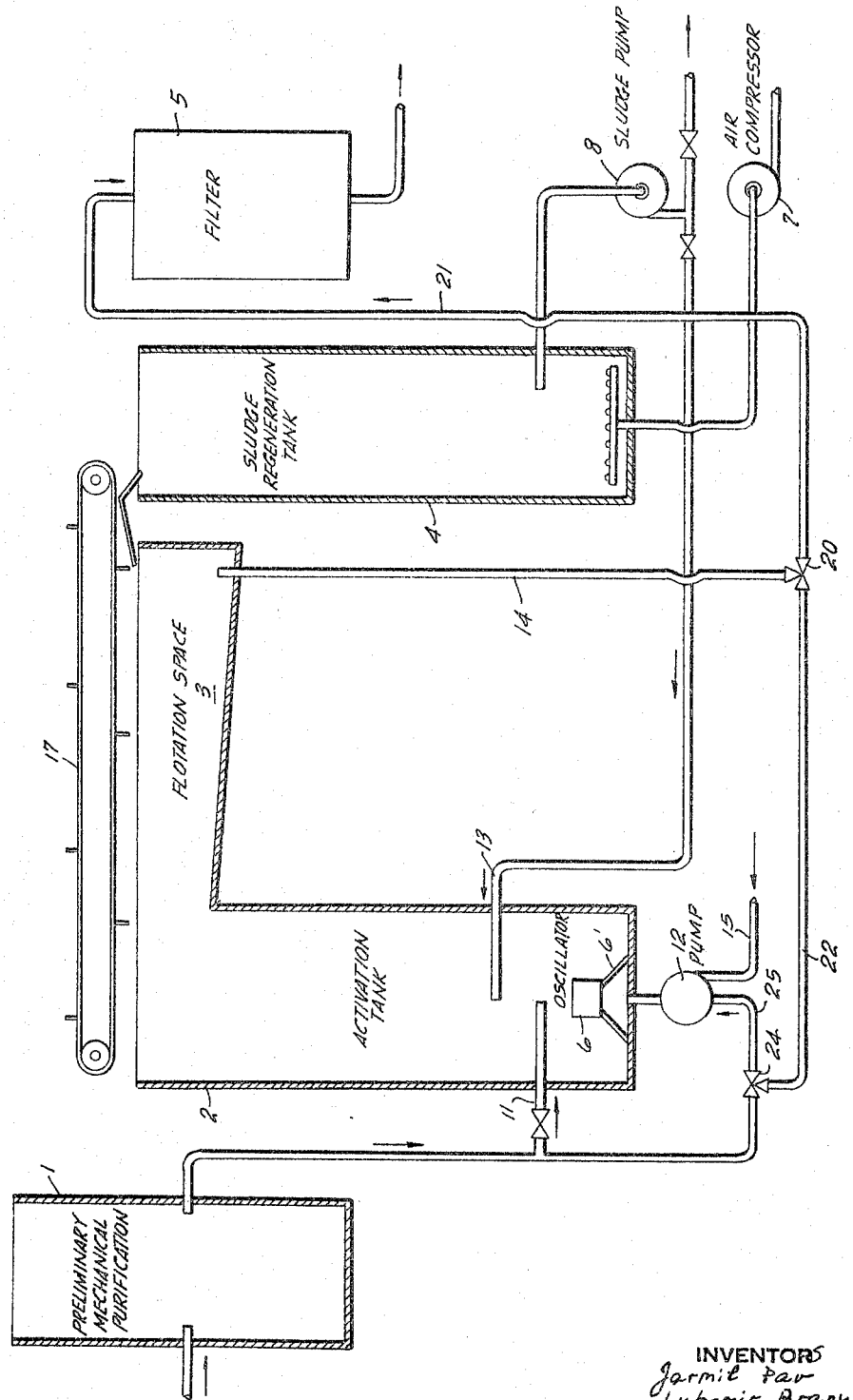

3,264,213
METHOD AND APPARATUS FOR CONTINUOUS BIOLOGICAL DEGRADATION OF METABOLISABLE SUBSTANCES
Jarmil Pav, 34 Nad Mazankou, and Lubomir Brany, 42 Ujezd, both of Prague, Czechoslovakia
Filed Oct. 27, 1964, Ser. No. 406,834
11 Claims. (Cl. 210—6)

The present invention relates to a method and apparatus for the continuous biological degradation of metabolisable substances and, more particularly, the present invention is concerned with the working up of waste materials which accrue in liquid form either as municipal waste or as industrial waste waters. With the continuing development of cities and industrial installations, the amount of sewage and other liquid media of various kind which contain metabolisable substances is increasing. These waste waters must be purified before they can be safely released into streams or other natural bodies of water.

Waste waters contain both suspended and dissolved substances. For the removal of the suspended substances various purification plant types and processes are employed. Of the dissolved substances that cannot be removed together with the suspended materials, those causing secondary pollution of streams are the most important and must be removed. For rendering these substances harmless, various purification devices based on the principle of activated sludge purification have been designed.

The activation process depends on the quality of the sludge, i.e. on the capability of the sludge to degrade the substances dissolved in waste water, and on the conditions of aeration, since continuous intensive aeration must take place throughout the entire activation procedure.

In the activation tank in which the waste waters and the like are treated to degrade dissolved biological substances, two processes take place simultaneously:

(a) The finely dispersed colloidal and dissolved substances are adsorbed on the surface of the active sludge flakes. This adsorption process proceeds very rapidly, so that within between one-half and two hours from the moment when waste water enters the activation tank, about 50% of all impurities are adsorbed on the sludge flakes and in this way eliminated from the thus treated waste water;

(b) A much slower second process consists in the gradual degradation and mineralization of the adsorbed substances. In the essence, this degradation process consists in the oxidation of carbonaceous substances by carbonization, and of nitrogenous substances by nitrification.

Particularly this second process depends on the specific aeration conditions.

The basic equipment for purification by means of activated sludge consists of activation tanks, sludge sedimentation tanks and, possibly also of tanks for regeneration of the sludge. A great number of different designs of such installations is known to those skilled in the art.

The shape of the activation tanks wherein the activation of the sludge-forming constituents of the waste water or liquid medium to be treated takes place may vary greatly. The volume of the activation tanks should be such as to permit the activation process to be completed therein. Generally a detention time of the liquid medium in the activation tank of six hours is required.

Since the organisms involved in the degradation of dissolved substances of the type described are aerobic, a sufficient supply of oxygen must be secured, otherwise serious troubles will occur in the purification process.

Therefore, it is important in these purification devices to disperse air in water as finely as possible in order to bring the maximum quantity of waste water in direct contact with air and to get the waste water supplied with dissolved oxygen. The existing plants meet this requirement only partly. Generally aeration is carried out by one of two methods, namely either with the use of mechanical devices known as the Kessener, Simplex, Haworth, Hartley systems, etc. which have the disadvantage that these aeration systems are of low effectiveness because the interface of the two phases water and air on which oxygen diffusion takes place is enlarged only to a relatively small extent, and according to another method, according to which air is introduced under pressure into the liquid medium and dispersed therein by means of porous plates, pipes, diffusers, or nozzles. Porous plates are usually assembled in groups of four in a frame. However, this second system also has a number of drawbacks including difficulties such as clogging of the plates or even breaking of the same, difficult packing, cleaning and the like.

It is the aim of designers of this type of equipment to create a type of aeration of the tank by which aeration and stirring of waste water would be most reliably secured and with the greatest economy, since the operational costs of aeration under comparable conditions and water quality are dependent on the consumption of atmospheric oxygen, i.e. on the intensity and economy of the aeration or the degree to which the oxygen of air will be taken up by the sludge and waste water. With the existing apparatus and method several shortcomings become apparent such as the great volume of the activation tanks which must be dimensioned for six hours detention of the waste water and thus have a capacity corresponding to the amount of waste water produced within six hours. Furthermore, the present aeration systems do not achieve a perfect aeration since the surface contact of the two phases, water and air, whereon oxygen diffusion takes place is relatively very small. Thus the air is not fully utilized and much more air must be supplied than would correspond to the amount of oxygen which is actually put to use. This great air consumption is immediately reflected in the operational costs of the purification plant. Systems aiming at partially obviating this lack of economy show a considerable rate of failure. This is so particularly with respect to aeration systems using porous materials for distribution of air into the liquid. In addition, in all of these activation purification plants large volume secondary sedimentation devices must be considered, since the sedimentation of sludge especially of its lighter portion, advances very slowly. The secondary sedimentation basins must be dimensioned for a detention time of at least two hours. The necessary volume of the same makes considerable demands with respect to space and investment. The partial floatability of activated sludge in overloaded purification plants is the cause of getting light sludge particles into the already purified water and thus affecting and reducing the purification effect to a substantial degree. Also, by a faulty manner of mud discharge from the tip of the secondary sedimentation basin, digestion of the accumulated sludge which is not sufficiently supplied with oxygen will take place and this again will impair the quality of the effluent and will depreciate the quality of the activated sludge. None of the above discussed methods does positively influence the metabolic effectiveness of activated sludge.

It is therefore an object of the present invention to overcome the above discussed difficulties and disadvantages.

It is a further object of the present invention to provide a process of purification of waste waters by degradation of metabolisable biological material therein, which can be carried out in a more effective and economical manner.

It is still another object of the present invention to provide a method and apparatus which will permit the purification of waste waters by metabolic degradation of biological substances in a shorter period of time and thus in equipment of lesser capacity.

It is yet a further object of the present invention to provide a method and apparatus which will positively influence the metabolic effectiveness of the activated sludge.

Other objects and advantages of the present invention will become apparent from a further reading of the description and of the appended claims.

With the above and other objects in view, the present invention contemplates an apparatus for continuous biological degradation of metabolisable substances contained in a liquid medium including sludge-forming constituents, comprising, in combination, an activation vessel having a lower and an upper portion, means for introducing the liquid medium into the lower portion of the activation vessel so that the same flows in upward direction and upon formation of sludge is separated in the upper portion of the activation vessel into the liquid medium and into the sludge, means for subjecting the separated sludge to an aeration treatment, means for reintroducing at least a portion of the thus aerated and activated sludge into the activation vessel at a point spaced above the point of introduction of the liquid medium so that the same become intermixed and the sludge-forming constituents of the liquid medium will be subjected to activation in contact with the aerated activated sludge, means for introducing into the activation vessel at a point located not higher than the point of introduction of the liquid medium oxygen-containing gaseous medium adapted to rise in the form of bubbles in the mixture of liquid medium and activated sludge in the activation vessel further aerating and thus activating the sludge-forming constituents, and oscillating means for creating cavitation-forming mechanical oscillations at a point located below the point of introduction of the aerated activtaed sludge.

The present invention is also concerned with a method for continuous biological degradation of metabolisable substances contained in a liquid medium including sludge-forming constituents thereby purifying the liquid medium, comprising the steps of introducing the liquid medium into the lower portion of an activation vessel so that the same flows in upward direction, introducing activated sludge into the activation vessel at a point spaced above the point of introduction of the liquid medium so that the activated sludge and the liquid medium become intermixed and the sludge-forming constituents of the liquid medium will be subjected to activation in contact with the activated sludge, introducing into the activation vessel at a point located not higher than the point of introduction of the liquid medium an oxygen-containing gaseous medium adapted to rise in the form of bubbles in the liquid medium-activated sludge mixture in the activation vessel further aerating and thus activating the sludge-forming constituents, subjecting the mixture of liquid medium, activated sludge and oxygen-containing medium to mechanical oscillations generated below the point of introduction of the activated sludge into the activation vessel thereby furthering activation of the sludge-forming constituents of the liquid medium, and separating in the upper portion of the activation vessel activated sludge from the thus purified liquid medium.

The present invention overcomes the above discussed drawbacks in the continuous biological degradation of metabolisable substances by means of activated sludge. According to the present method and apparatus for continuous degradation of metabolisable substances contained in sewage and other liquid media, activated sludge and the liquid media which are to be treated are subjected to the action of mechanical oscillations, excited by a source of mechanical oscillations.

The apparatus for carrying out the present invention includes an activation vessel or tank provided in its lower portion with a source of mechanical oscillations. Activated sludge is discharged into the activation space through a sludge distributor which introduces the sludge at a distance of between 15 and 60 cm. above the source of mechanical oscillations so that the thus introduced sludge will be out of reach of the most intensive field of cavitation produced by the source of mechanical oscillation. The liquid medium to be treated is introduced into the activation tank at a point below the distribution point of the activated sludge. With the aid of the mechanical oscillation, perfect diffusion of dispersed air within the entire volume of the medium to be treated will be achieved. The thus again produced activated sludge is discharged to a recovery station or sludge regeneration tank while it is perfectly provisioned with air. The air dispersion is utilized at the same time to cause flotation of the activated sludge and thus separation of the treated liquid medium from the activated sludge. By the reaction of mechanical oscillations, the degradation of metabolisable substances is intensified while the oscillation energy absorbed by the treated liquid medium is converted into heat. The present method and apparatus avoid the dead regions which are found in conventional sedimentation tanks and in which it frequently comes to septicization of the sludge due to insufficient supply of air which in such conventional devices cannot be supplied additionally because it would disturb the sedimentation process.

The advantages of the present invention include that the metabolic effectiveness of some components of the activated sludge is intensified by the action of the mechanical oscillations and thus the degradation of metabolisable substances is accelerated.

Furthermore, the present method and apparatus requires much less space than the conventional large volume sedimentation plant. Sedimentation is replaced by flotation and sedimentation tanks by the small flotation space which forms part of the activation tank. The fine air dispersion and aeration is utilized for flotation which process is much more rapid and more intensive than sedimentation.

Due to the perfect aeration which is attained according to the present invention, the detention time of the liquid medium in the activation tank can be reduced to a substantially shorter time than is conventionally required and generally a time of up to one hour or even considerably less than one hour will suffice and this will considerably cut down the required volume of activation tanks for any given amount of liquid medium which is to be treated per unit of time. This again will reduce the space requirements and the plant investment.

The aeration system according to the present invention achieves a microscopic dispersion of air in the liquid medium through the direct action of mechanical oscillations and thereby the maximum possible contact surface between the two phases, namely the air phase and the liquid phase is achieved with permanent supply of oxygen and perfect utilization of the supplied oxygen for biological oxidation. Due to the maximum utilization of the introduced air uneconomic losses of air are avoided and the operational costs of the plant are reduced. The apparatus of the present invention is sturdy and the aeration system can be made to work substantially without failure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing is a diagrammatic showing of an activated sludge sewage processing plant according to the present invention.

Referring now to the drawing, it will be seen that the liquid medium passes first through a preliminary mechanical purification device 1 of conventional design and from there into activation tank 2 which is provided at its upper end with a flotation space 3. The liquid medium enters activation tank 2 either at a point above mechanical oscillator 6 through conduit 11, or by way of three-way valve 24, conduit 25 and pump 12. At a somewhat higher point above the introduction of the liquid medium, activated sludge from sludge regeneration tank 4 is introduced through sludge pump 8 and conduit 13. When the liquid medium is not too contaminated it will be introduced into activation tank 2 through pump 12. Through a suction conduit 15 pump 12 at the same time will introduce the required amount of air into activation tank 2. However, when the liquid medium is too contaminated so that it requires dilution, then the liquid medium will be introduced through conduit 11 and simultaneously through pump 12 clean liquid from the lowermost point of flotation space 3 will be introduced through conduit 14 to pump 12 and together with suction air introduced into pump 12 through suction line 15 into activating tank 2. The operation of oscillator 6 will guarantee perfect aeration due to the microscopic dispersion of air throughout the treated liquid medium. It may be noted that the supplied activated sludge is introduced somewhat higher and rather distant from the oscillator and this is necessary in order not to expose the living microorganism of the activated sludge to the direct effect of intensified mechanical vibrations and especially of strong cavitation. With conventional generators of mechanical oscillations the distance between the oscillator and the place of introduction of the activated sludge through conduit 13 should be at least about 20 cm. definitely not less than 15 cm. in order to avoid destruction of the microorganism. The maximum practical distance will be approximately 60 cm. and the preferred distance between the oscillator and the point of introduction of the activated sludge will be about 40 cm. The liquid medium or raw waste water is supplied at a lower point, either through conduit 11 to a point between the oscillator and the point of introduction of the activated sludge, or through pump 12 at the bottom of the activation tank 2 below the oscillator. Oscillator 6 is mounted in activation tank 2 on supports 6' and supports 6' may also serve to carry the electric wiring required for an electrically operated oscillator.

In the activation tank 2 the first phase of the activation process, namely adsorption of the dissolved substances on the activated sludge plates will take place. Due to the finely diffused air, the activated sludge will be supplied with a maximum amount of oxygen. Microscopic air bubbles will get stuck on the suspended substances and on the sludge particles and will induce activation and flotation of the same. Activating tank 2 is formed in its upper portion with outwardly extending flotation space 3 on the top of which the sludge particles will collect while at the bottom of flotation space 3 practically clear and purified liquid will collect which, if necessary, may be reintroduced at least partially into activation tank 2 through conduit 14 and pump 12.

By the effect of mechanical oscillation upon the activated sludge, the metabolic activity of the latter is increased and the metabolic processes involved in degrading the metabolisable substances are accelerated, in other words, the second phase of the activation process is also substantially accelerated. The sludge flotation is much more rapid and effective than sedimentation processes. For this reason, the flotation space can be relatively small as compared with the volume required in sedimentation devices.

The floating sludge is raked off from the surface of activation tank 2 including flotation space 3 by means of rake 17 and conveyed into sludge regeneration tank 4 where the aeration of the sludge is continued. After regeneration of the sludge has been completed, the same is partly pumped back into activation tank 2 through sludge pump 8 and conduit 13, while the excess sludge will be discharged into septicization tanks or sludge beds. Purified water is withdrawn from the bottom of flotation space 3 and passes through conduit 14, three-way valve 20, conduit 21 and filter 5 into a receiver. In case of insufficient inflow of liquid medium to be treated into activation tank 2 or in case of breakdown or when the liquid medium is so contaminated that it has to be diluted, water from the bottom of the flotation space may also be introduced together with air into the bottom portion of activation tank 2 by means of conduit 14, three-way valve 20, conduit 22, three-way valve 24, conduit 25 and pump 12. Air compressor 7 serves for introducing air into the sludge regeneration tank.

The oscillation generator may be any conventional generator of mechanical oscillations which will operate immersed in liquid. Lower frequencies are desirable with relatively great amplitudes, sufficient to cause cavitation. The frequency region best suitable for this operation will be within the range of between 1 and 50 kHz. The dimensions of the activation tank 2 will be so chosen that the entire water volume therein will be rapidly permeated with the dispersed air introduced through pump 12 and finely dispersed by operation of oscillator 6.

The proportion of activated sludge introduced into activation tank 2 may vary greatly depending on the composition of the waste waters which are to be treated and generally will be between about 100 and 400 cm.$^3$ per liter of the liquid medium which is to be treated.

It will be understood that each of the elements described above, or two or more together, may also find a useful application in other types of apparatus for continuous biological degradation of metabolisable substances differing from the types described above.

While the invention has been illustrated and described as embodied in a sewage disposal plant, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for continuous biological degradation of metabolisable substances contained in a liquid medium including sludge-forming constituents, comprising, in combination, an activation vessel having a lower and an upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located not higher than the point of introduction of said liquid medium oxygen-containing gaseous medium adapted to rise in the form of bubbles in the mixture of liquid medium and activated sludge in said activation vessel further aerating and thus activating said sludge-forming constituents; and oscillating means for creating cavitation-forming mechanical oscillations at a point located below the point of introduction of said aerated activated sludge.

2. Apparatus for continuous biological degradation of metabolisable substances contained in a liquid medium including sludge-forming constituents, comprising, in combination, an activation vessel having a lower and an upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located not higher than the point of introduction of said liquid medium oxygen-containing gaseous medium adapted to rise in the form of bubbles in the mixture of liquid medium and activated sludge in said activation vessel further aerating and thus activating said sludge-forming constituents; and oscillating means for creating cavitation-forming mechanical oscillations at a point located below the point of introduction of said aerated activated sludge at such distance that the point of introduction of said aerated activated sludge is located outside of the most intense area of cavitations created by said oscillating means.

3. Apparatus for continuous biological degradation of metabolisable substances contained in a liquid medium including sludge-forming constituents, comprising, in combination, an activation vessel having a lower and an upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located not higher than the point of introduction of said liquid medium oxygen-containing gaseous medium adapted to rise in the form of bubbles in the mixture of liquid medium and activated sludge in said activation vessel further aerating and thus activating said sludge-forming constituents; and oscillating means for creating cavitation-forming mechanical oscillations at a point located below the point of introduction of said aerated activated sludge at a distance of between about 20 and 60 cm. so that the point of introduction of said aerated activated sludge is located outside of the most intense area of cavitations created by said oscillating means.

4. Apparatus for continuous biological degradation of metabolisable substances contained in a liquid medium including sludge-forming constituents, comprising, in combination, an activation vessel having a lower and an upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located below the point of introduction of said liquid medium oxygen-containing gaseous medium adapted to rise in the form of bubbles in the mixture of liquid medium and activated sludge in said activation vessel further aerating and thus activating said sludge-forming constituents; and oscillating means for creating cavitation-forming mechanical oscillations at a point located below the point of introduction of said aerated activated sludge and said liquid medium.

5. Apparatus for continuous biological degradation of metabolisable substances contained in a liquid medium including sludge-forming constituents, comprising, in combination, an activation vessel having a lower and an upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located below the point of introduction of said liquid medium a mixture of at least a portion of said separated liquid medium and of an oxygen-containing gaseous medium adapted to rise in the form of bubbles in the mixture of liquid medium and activated sludge in said activation vessel further aerating and thus activating said sludge-forming constituents; and oscillating means for creating cavitation-forming mechanical oscillations at a point located below the point of introduction of said aerated activated sludge and said liquid medium.

6. A method for continuous biological degradation of metabolisable substances contained in a liquid medium including sludge-forming constituents thereby purifying said liquid medium, comprising the steps of introducing said liquid medium into the lower portion of an activation vessel so that the same flows in upward direction; introducing activated sludge into said activation vessel at a point spaced above the point of introduction of said liquid medium so that said activated sludge and said liquid medium become intermixed and the sludge-forming constituents of said liquid medium will be subjected to activation in contact with said activated sludge; introducing into said activation vessel at a point located not higher than the point of introduction of said liquid medium an oxygen-containing gaseous medium adapted to rise in the form of bubbles in the mixture of liquid medium and activated sludge mixture in said activation vessel further aerating and thus activating said sludge-forming constituents; subjecting the mixture of liquid medium, activated sludge and oxygen-containing medium to mechanical oscillations generated below the point of introduction of said activated sludge into said activation vessel thereby furthering activation of the sludge-forming constituents of said liquid medium; and separating in the upper portion of said activation vessel activated sludge from the thus purified liquid medium.

7. A method for continuous biological degradation of metabolisable substances contained in a liquid medium including sludge-forming constituents thereby purifying said liquid medium, comprising the steps of introducing said liquid medium into the lower portion of an activation vessel so that the same flows in upward direction; introducing activated sludge into said activation vessel at a point spaced above the point of introduction of said liquid medium so that said activated sludge and said liquid medium become intermixed and the sludge-forming constituents of said liquid medium will be subjected to activation in contact with said activated sludge; introducing into said activation vessel at a point located not higher than the point of introduction of said liquid medium an oxygen-containing gaseous medium adapted to rise in the form of bubbles in the mixture of liquid medium and activated sludge mixture in said activation vesesl further aerating and thus activating said sludge-forming constituents; subjecting the mixture of liquid medium, activated sludge and oxygen-containing medium to mechanical oscillations forming cavitations and being generated below the point of introduction of said activated sludge into said activation vessel at a distance of between about 20 and 60 cm. so that said activated sludge is located outside of the most intense area of cavitations created by said mechanical oscillations thereby furthering activation of the sludge-forming constituents of said liquid medium; and separating in the upper portion of said activation vessel activated sludge from the thus purified liquid medium.

8. A method for continuous biological degradation of metabolisable substances contained in a liquid medium including sludge-forming constituents thereby purifying said liquid medium into the lower portion of an activation vessel so that the same flows in upward direction; introducing activated sludge into said activation vessel at a point spaced above the point of introduction of said liquid medium so that said activated sludge and said liquid medium become intermixed and the sludge-forming constituents of said liquid medium will be subjected to activation in contact with said activated sludge; introducing into said activation vessel at a point located not higher than the point of introduction of said liquid medium an oxygen-containing gaseous medium adapted to rise in the form of bubbles in the mixture of liquid medium and activated sludge mixture in said activation vessel further aerating and thus activating said sludge-forming constituents; subjecting the mixture of liquid medium, activated sludge and oxygen-containing medium to mechanical oscillations of a frequency within the range of between 1 and 50 kHz. and generated below the point of introduction of said activated sludge into said activation vessel thereby furthering activation of the sludge-forming constituents of said liquid medium; and separating in the upper portion of said activation vessel activated sludge from the thus purified liquid medium.

9. Apparatus for continuous biological degradation of metabolisable substances contained in a liquid medium including sludge-forming constituents, comprising, in combination, an activation vessel having a lower and an upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located not higher than the point of introduction of said liquid medium oxygen-containing gaseous medium adapted to rise in the form of bubbles in the mixture of liquid medium and activated sludge in said activation vessel further aerating and thus activating said sludge-forming constituents; and oscillating means for creating cavitation-forming mechanical oscillations of a frequency within the range of between 1 and 50 kHz. at a point located below the point of introduction of said aerated activated sludge.

10. Apparatus for continuous biological degradation of metabolisable substances contained in an aqueous liquid medium including sludge-forming constituents, comprising, in combination, an activation vessel having a lower and upper portion; means for introducing said liquid medium into said lower portion of said activation vessel so that the same flows in upward direction and upon formation of sludge is separated in said upper portion of said activation vessel into said liquid medium and into said sludge; means for subjecting said separated sludge to an aeration treatment; means for reintroducing at least a portion of the thus aerated and activated sludge into said activation vessel at a point spaced above the point of introduction of said liquid medium so that the same become intermixed and the sludge-forming constituents of said liquid medium will be subjected to activation in contact with said aerated activated sludge; means for introducing into said activation vessel at a point located not higher than the point of introduction of said liquid medium air adapted to rise in the form of bubbes in the mixture of liquid medium and activated sludge in said activation vessel further aerating and thus activating said sludge-forming constituents; and oscillating means for creating cavitation-forming mechanical oscilations at a point located below the point of introduction of said aerated activated sludge.

11. A method for continuous biological degradation of metabolisable substances contained in an aqueous liquid medium including sludge-forming constituents thereby purifying said liquid medium, comprising the steps of introducing said liquid medium into the lower portion of an activation vessel so that the same flows in upward direction; introducing activated sludge into said activation vessel at a point spaced above the point of introduction of said liquid medium so that said activated sludge and said liquid medium become intermixed and the sludge-forming constituents of said liquid medium will be subjected to activation in contact with said activated sludge; introducing into said activation vessel at a point located not higher than the point of introduction of said liquid medium air as an oxygen-containing gaseous medium adapted to rise in the form of bubbles in the mixture of liquid medium and activated sludge mixture in said activation vessel further aerating and thus activating said sludge-forming constituents; subjecting the mixture of liquid medium, activated sludge and oxygen-containing medium to mechanical oscillations generated below the point of introduction of said activated sludge into said activation vessel thereby furthering activation of the sludge-forming constituents of said liquid medium and dispersing the oxygen contained in the liquid medium into highly fine bubbles; and separating in the upper portion of said activation vessel activated sludge from the thus purified liquid medium.

References Cited by the Examiner

UNITED STATES PATENTS

| | | | |
|---|---|---|---|
| 2,417,722 | 3/1947 | Wolff | 210—63 X |
| 3,117,082 | 1/1964 | Schluter | 210—221 |
| 3,121,680 | 2/1964 | Ciabattari | 210—44 |
| 3,207,313 | 9/1965 | Schulze | 210—195 |

OTHER REFERENCES

Nidsen, D. M.: Electronics in Water Supply and Sewage Treatment, Water Works and Sewerage, vol. 92, September 1945, pp. 271–274, page 273 in particular.

MORRIS O. WOLK, *Primary Examiner.*

M. E. ROGERS, *Assistant Examiner.*